United States Patent
Fraas et al.

(10) Patent No.: US 11,536,392 B2
(45) Date of Patent: Dec. 27, 2022

(54) SHAFT BEARING BUSH ASSEMBLY FOR A VALVE ARRANGEMENT

(71) Applicant: Mahle International GmbH, Stuttgart (DE)

(72) Inventors: Marc Fraas, Bietgheim-Bissingen (DE); Holger Laux, Dietingen (DE); Walter Wolf, Oppenweiler-Zell (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/120,112

(22) Filed: Dec. 12, 2020

(65) Prior Publication Data

US 2021/0180716 A1    Jun. 17, 2021

(30) Foreign Application Priority Data

Dec. 13, 2019  (DE) .......................... 102019219533.4

(51) Int. Cl.
*F16K 31/44* (2006.01)
*F16C 17/02* (2006.01)

(52) U.S. Cl.
CPC .............. *F16K 31/44* (2013.01); *F16C 17/02* (2013.01)

(58) Field of Classification Search
CPC ...... B60H 1/00692; F16C 17/02; F16C 33/04; F16K 31/44
USPC ...................................................... 251/286
See application file for complete search history.

(56) References Cited

U.S. PATENT DOCUMENTS

| 1,095,209 | A | * | 5/1914 | Humphrey | .............. F16K 31/44 251/294 |
| 1,558,992 | A | * | 10/1925 | Lombardi | ............. F16K 5/0214 251/285 |
| 1,641,675 | A | * | 9/1927 | Harper | .................... F16K 5/222 251/286 |

(Continued)

FOREIGN PATENT DOCUMENTS

| CN | 105387079 A | 3/2016 |
| CN | 107650627 A | 2/2018 |

(Continued)

OTHER PUBLICATIONS

English abstract for DE-10065204.

(Continued)

*Primary Examiner* — Umashankar Venkatesan
(74) *Attorney, Agent, or Firm* — Fishman Stewart PLLC

(57) ABSTRACT

A shaft-bearing bush assembly for a valve arrangement for an air-conditioning system is disclosed. The shaft-bearing bush assembly includes a shaft drive-connectable to a valve of the valve arrangement and a bearing bush, in which the shaft is rotatably received relative to the bearing bush between a first rotary position and a second rotary position about an axis of rotation extending along the axial direction. A bush projection is non-rotatably arranged on the bearing bush relative to the bearing bush and a shaft projection is non-rotatably arranged on the shaft relative to the shaft. The bush projection and the shaft projection are matched to one another such that the bush projection provides a rotary stop for the shaft projection for limiting the rotary movement of the shaft between the first rotary position and the second rotary position.

17 Claims, 3 Drawing Sheets

(56) References Cited

U.S. PATENT DOCUMENTS

| | | | | | |
|---|---|---|---|---|---|
| 3,344,683 | A | * | 10/1967 | Cerow, Jr. | ............... F16K 31/44 74/526 |
| 5,010,917 | A | * | 4/1991 | Iqbal | .................... F16K 27/045 137/454.6 |
| 10,393,183 | B2 | | 8/2019 | Goce et al. | |
| 2003/0229993 | A1 | * | 12/2003 | Agne | .................... A01D 34/90 30/276 |

FOREIGN PATENT DOCUMENTS

| | | |
|---|---|---|
| CN | 209552874 U | 10/2019 |
| DE | 10065204 A1 | 7/2002 |
| DE | 102008033200 A1 | 1/2010 |
| EP | 1216861 A2 | 6/2002 |
| EP | 2147810 A1 | 1/2010 |
| JP | 2003097755 A | 4/2003 |

OTHER PUBLICATIONS

English abstract for DE-102008033200.
Chinese Office Action dated Apr. 20, 2022 and Chinese Search Report dated Apr. 14, 2022 for Chinese Patent Application No. 2020114585497.

* cited by examiner

SHAFT BEARING BUSH ASSEMBLY FOR A VALVE ARRANGEMENT

CROSS-REFERENCE TO RELATED APPLICATION

This application claims priority to German Application No. DE 10 2019 219 533.4 filed on Dec. 13, 2019, the contents of which are hereby incorporated by reference in its entirety.

TECHNICAL FIELD

The invention relates to a shaft-bearing bush assembly for a valve arrangement having a valve for an air-conditioning system. In addition, the invention relates to a valve arrangement having such a shaft-bearing bush assembly for an air-conditioning system and to an air-conditioning system for air-conditioning a vehicle interior.

BACKGROUND

Air-conditioning systems, which have been employed in motor vehicles for some time, serve for air-conditioning a vehicle interior. For varying important climate parameters such as air temperature, air humidity or fresh air proportion of air present in the vehicle interior, conventional air-conditioning systems comprise a valve arrangement having an adjustable valve. By means of this valve, a fluid flow of a fluid such as air that can be fed to the vehicle interior via the air-conditioning system can be influenced. Such influencing can be a throttling of the fluid flow or a changing of a mixture ratio of a hot fluid and of a cold fluid, which form the fluid flow.

Such valve arrangements for air-conditioning systems usually comprise a shaft-bearing bush assembly, which comprises a driveshaft that is drive-connected to a valve of the valve arrangement. For influencing the fluid flow, the valve is usually adjustable between a first and a second end position. Such a valve can be embodied for example as a rotary valve, drum valve, pivot valve or sliding valve. For fixing this first and second position, conventional air-conditioning systems comprise stops which are arranged fixed in place on a housing wall of a housing surrounding the valve.

In addition, there also exist solutions for fixing the first and the second position of the valve in which a lever element is employed, which for forming a stop for fixing the first or the second position of the valve can be brought into engagement with recesses that are present on the driveshaft driving the valve.

Here it is considered disadvantageous that such levers for forming the stop increase a number of parts of the air-conditioning system. This is accompanied by an increased assembly expenditure. Such stop levers also require relatively much installation space which, considering package aspects of the air-conditioning system, proves to be disadvantageous. Furthermore, such lever elements also bring about an increased weight of the air-conditioning system. In addition, additional components forming a dimensional chain or the number of interfaces between these components of such a dimensional chain increase the tolerances of the entire dimensional chain in an undesirable manner. In the case of stop elements arranged on the housing wall, it proves to be disadvantageous that the valve is subjected to an increased mechanical load when the same, for assuming the first or second end position, is driven against the stop element.

It is therefore an object of the present invention to show new ways for a shaft-bearing bush assembly for a valve arrangement and for such a valve arrangement having the shaft-bearing bush assembly and for air-conditioning systems having such a valve arrangement—in particular for eliminating the abovementioned disadvantages.

This object is solved through the subject according to the independent patent claims. Preferred embodiments are subject of the dependent patent claims.

SUMMARY

The basic idea of the invention therefore is to provide projections that are matched to one another and form a rotary stop for fixing a first and a second end position of a valve on a shaft that is drive-connected to the valve and on a bearing bush mounting the shaft.

This rotary stop limits a rotary movement of the shaft relative to the bearing bush, so that a first and a second rotary position of the shaft are fixed. As a consequence of the drive connection of the shaft to the valve, these fixed first and second rotary positions directly realise the first and the second end position of the valve.

Advantageously, this makes possible a particularly installation space-saving fixing of the first and the second end position of the valve. Apart from this, additional stop levers can be saved which likewise has a positive effect on the required installation space of the air-conditioning system with the shaft-bearing bush assembly. Equally, this results in cost advantages and a weight saving since separate lever elements can be dispensed with. In addition to this, a time and cost-intensive assembly process for assembling such stop levers is no longer required. Finally, a mechanical load acting on the valve is advantageously reduced since the valves do not have to be driven up against a stop element arranged on the housing wall surrounding the valve. In addition to this, a drive torque, which is introduced into the valve via a shaft end, can be directly introduced over a short distance into the bearing bush in the movement end positions. By way of this, a greater torsional load of the shaft can be effectively avoided in the region of the drive connection to the valve.

According to the invention, the shaft-bearing bush assembly, which can be employed for a valve arrangement having a valve for an air-conditioning system, comprises a shaft extending along an axial direction. The shaft-bearing bush assembly is practically a driveshaft-bearing bush assembly, i.e. the shaft is practically a driveshaft. The shaft can be drive-connected to the valve of the valve arrangement for the air-conditioning system. In addition, the shaft-bearing bush assembly comprises a bearing bush in which the shaft is rotatably received relative to the bearing bush between a first rotary position and a second rotary position about an axis of rotation extending along the axial direction of the shaft. On the bearing bush, a (first) bush projection is non-rotatably arranged relative to the bearing bush. The shaft comprises a (first) shaft projection that is non-rotatably arranged relative to the shaft. The (first) bush projection and the (first) shaft projection are matched to one another in such a manner that the (first) bush projection forms a rotary stop for the (first) shaft projection. This rotary stop serves for limiting the rotary movement of the shaft between the first and the second rotary position. The rotary stop thus fixes the first and the second rotary position. Advantageously, separate stop elements such as stop levers can thus be saved which brings about direct advantages in terms of the required installation space, the tolerances and with respect to the costs.

Practically, a second shaft projection is present on the shaft of the shaft-bearing bush assembly. The second shaft projection is designed analogously to the first shaft projection and arranged at a shaft-projection distance from the first shaft projection along a circumferential direction of the shaft. Alternatively or additionally, a second bush projection is present on the bearing bush which is formed analogously to the first bush projection. The second bush projection is arranged at a bush-projection distance from the first bush projection along the circumferential direction of the bearing bush. Advantageously, the fixing of the first and second rotary position of the shaft can be carried out particularly reliably by means of the second shaft projection and of the second bush projection respectively.

In an advantageous further development, the first and the second shaft projection is arranged, viewed in a cross section perpendicularly to the axial direction, projecting from the shaft and offset relative to one another by an angle of rotation measured in the circumferential direction and at a shaft-projection distance from one another. Alternatively or additionally, the first and the second bush projection are arranged in the cross section perpendicularly to the axial direction projecting from the bearing bush and offset relative to one another by an angle of rotation measured in the circumferential direction and at the bush-projection distance from one another. Advantageously, the first and the second rotary position can be particularly precisely fixed by means of such a shaft-bearing bush assembly.

A further advantageous further development of the shaft-bearing bush assembly provides that on the shaft both the first and also the second shaft projection are provided. However on the bearing bush, exclusively the first bush projection is present. Alternatively, both the first and also the second bush projection is provided on the bearing bush and exclusively the first shaft projection is present on the shaft. Advantageously, this makes possible a particularly material-saving fixing of the first and second rotary position of the shaft, since merely three projections are employed for forming the rotary stop.

Practically, the first bush projection is arranged, viewed in the cross section perpendicularly to the axial direction, along the circumferential direction between the first and the second shaft projection. Alternatively, the first shaft projection is arranged, in the cross section perpendicularly to the axial direction, along the circumferential direction between the first and the second bush projection. Advantageously, this makes possible a particularly installation space-saving design of the rotary stop.

In an advantageous further development of the shaft-bearing bush assembly, the bearing bush comprises a bearing section which in the axial direction merges into a stop section. Here, the shaft is rotatably mounted in the bearing section of the bearing bush. In the stop section, the (first and/or second) bush projection is arranged. By way of this, the rotatable mounting of the shaft in the bearing bush can be particularly favourably ensured, wherein at the same time the first and second rotary position of the shaft can be reliably fixed.

Practically, the (first and/or second) bush projection can be arranged on an axial bush end face of the bearing bush, which is present at a transition between the bearing section and the stop section. The (first and/or second) bush projection projects from the bush end face along the axial direction. Advantageously, a bush projection formed in such a manner has a particularly favourable load capacity and is of a particularly compact design.

In a preferred further development, the bearing bush comprises a circumferential stop section collar in the circumferential direction of the bearing bush, which projects axially from the bush end face. On the stop section collar, the (first and/or second) bush projection is arranged projecting radially to the inside. Such a stop section collar has a reinforcing and stiffening effect on the (first and/or second) bush projection, which advantageously improves the load capacity of the rotary stop. Practically, the bearing bush and the shaft as well as the stop section collar are arranged coaxially relative to one another.

Practically, the (first and/or second) shaft projection is designed rib-like. Particularly practically, the (first and/or second) shaft projection extends over a rib length, measured in the axial direction, of 4 to 6 mm and radially over a rib height measured away from an outer surface of the shaft of 2 to 4 mm. Alternatively or additionally, the (first and/or second) bush projection is formed rib-like. Particularly practically, the (first and/or second) bush projection extends over a rib length, measured in the axial direction, of 4 mm to 6 mm and over a radially measured rib height of 2 mm to 8 mm. Advantageously, this makes possible a design of the rotary stop that has a particularly high load capacity and is thus particularly reliable. A dimensioning the shaft or the bush projections therefore depends on the active drive torques, a material selection, as well as mechanical and thermal properties of the selected materials.

According to an advantageous further development of the shaft-bearing bush assembly, the (first and/or second) shaft projection limits a pocket-like recess that is present on the shaft. Alternatively or additionally, the (first and/or second) bush projection limits a pocket-like recess that is present on the bearing bush. Such recesses can be particularly precisely produced with cutting, in particular manufacturing methods, by way of which the first and the second rotary position can be particularly precisely fixed. Alternatively, such recesses can be advantageously produced by means of an injection moulding method integrally within a housing structure, i.e. material-uniformly and in one piece, and with adequate precision on the housing structure.

Practically, a fastening device is provided on the shaft of the shaft-bearing bush assembly, by means of which the valve can be fastened non-rotatably relative to the shaft. Particularly practically, the valve can be integrally moulded on the shaft, so that the valve and the shaft are formed material-uniformly and in one piece. Alternatively, a gear wheel is non-rotatably arranged on the shaft of the shaft-bearing bush assembly, which gear wheel serves for transmitting a torque for moving the valve. Advantageously, by way of this, the first and second rotary position of the shaft relative to the bearing bush fixed by means of the shaft-bearing bush assembly can be particularly favourably transmitted to the valve for fixing a first and second position of the valve.

According to a further advantageous further development, the shaft is received in the bearing bush in a receiving region of the shaft. In the receiving region, the shaft comprises a bearing surface. The bearing bush likewise comprises a bearing surface which is practically designed complementarily to the bearing surface of the shaft. Particularly practically, the bearing surface of the bearing bush is arranged in the bearing section of the bearing bush. At least one of the bearing bushes—i.e. at least either the bearing surface of the shaft or the bearing surface of the bearing bush—is substantially smooth or has a structure for receiving a lubricant. This makes it advantageously possible to mount the shaft so as to be particularly smoothly rotatable in the bearing bush. Preferably, a lubricant is alternatively or additionally integrated in a material of the bearing bush and/or of the shaft. Alternatively, the shaft and/or the bearing bush can consist of materials which, taken by themselves or as a pair, have good sliding properties so that no additional lubricants are required.

A further preferred further development of the shaft-bearing bush assembly provides that the (first and/or second) shaft projection is integrally moulded on the shaft, i.e. material-uniformly and in one piece. Alternatively or additionally, the (first and/or second) bush projection is integrally moulded on the bearing bush. Alternatively or additionally, the bearing bush is integrally moulded on a housing, so that the bearing bush and the housing are formed material-uniformly and in one piece. Advantageously, this makes it possible that the bearing bush or the shaft can be embodied in one piece. Such a shaft embodied in one piece or such a bearing bush embodied in one piece can be particularly cost-effectively produced in a primary moulding manufacturing method, which in particular in large quantities brings about cost advantages utilising economies of scale.

Apart from this, the invention relates to a valve arrangement for an air-conditioning system, which comprises an adjustable valve for influencing a fluid flow. Apart from this, the valve arrangement comprises a shaft-bearing bush assembly as described above. The shaft-bearing bush assembly drive-connects in the shaft-bearing bush assembly the valve to a drive device of the valve arrangement. The advantages of a shaft-bearing bush assembly according to the invention shown above analogously apply also to the valve arrangement having such a shaft-bearing bush assembly. Practically, a drive torque of 0.2 to 2.5 Newton metres can be generated by means of the drive device.

In addition to this, the invention relates to an air-conditioning system for air-conditioning a vehicle interior, which is practically an air-conditioning system for a motor vehicle for air-conditioning a vehicle interior. The air-conditioning system comprises a valve arrangement for influencing a fluid flow as described above. This fluid flow is fed to the vehicle interior to be air conditioned by means of the air-conditioning system. Apart from this, the air-conditioning system comprises a fluid passage which can be flowed through by the fluid flow that can be influenced by means of the valve arrangement. The advantages of the valve arrangement with a shaft-bearing bush assembly according to the invention shown above analogously apply also to the air-conditioning system having such a valve arrangement.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1A:
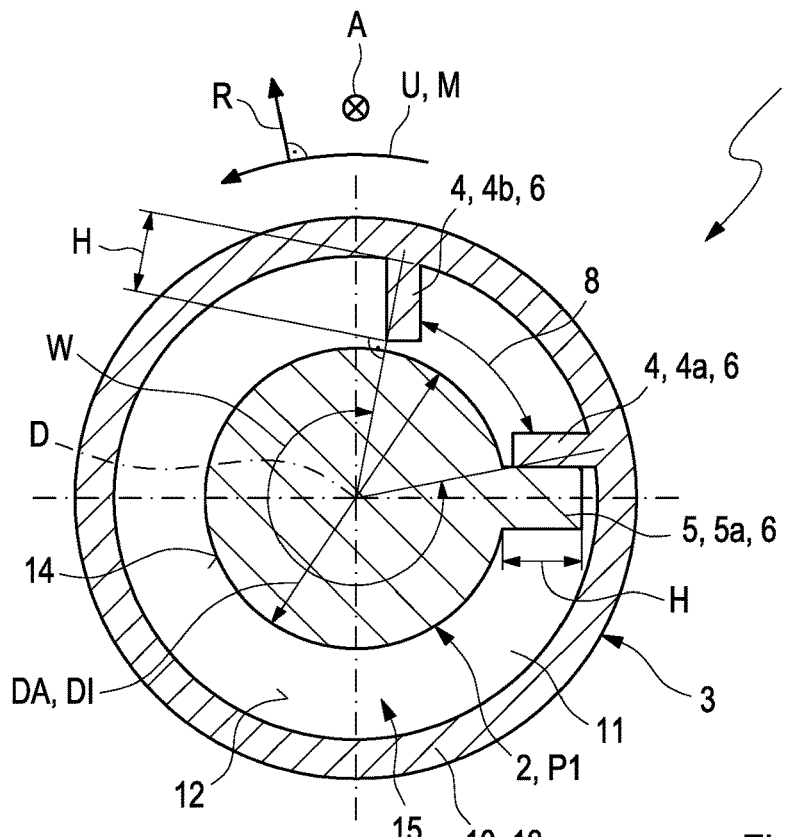
FIG. 1A an example of a shaft-bearing bush assembly according to the invention in a section transversely to an axial direction with a shaft in a first rotary position, FIG. 1B the example of FIG. 1A with the shaft in a second rotary position, FIG. 2 exemplarily a valve arrangement according to the invention with a shaft-bearing bush assembly according to the invention in a section along the axial direction, FIG. 3 exemplarily a bearing bush for a shaft-bearing bush assembly according to the invention in a perspective representation, FIG. 4 an example of a valve arrangement according to the invention with a shaft-bearing bush assembly according to the invention in a perspective representation, FIG. 5 a further example of a valve arrangement according to the invention with a shaft-bearing bush assembly according to the invention in a perspective representation.

In FIG. 1a, a shaft-bearing bush assembly 1 according to the invention is exemplarily shown. The shaft-bearing bush assembly 1 can be a driveshaft-bearing bush assembly. The shaft-bearing bush assembly 1 is suitable for forming a valve arrangement KA with a valve K for an air-conditioning system. The shaft-bearing bush assembly 1 comprises a shaft 2, which extends along an axial direction A. The axial direction A extends along a centre longitudinal axis of the bearing bush 3 or of the shaft 2. A radial direction R extends away from the axial direction A perpendicularly to the same. A circumferential direction U runs roundabout the centre longitudinal axis and thereby extends perpendicularly to both the axial direction A and also the radial direction R. The shaft 2 is embodied in such a manner that it can be drive connected to the valve K.

The shaft-bearing bush assembly 1 comprises a bearing bush 3. The shaft 2 is rotatably received in the bearing bush 3 relative to the bearing bush 3. In FIG. 1a, the shaft 2 is arranged in a first rotary position P1, starting out from which the shaft 2 is rotatable relative to the bearing bush 3 into a second rotary position P2.

Figure 1B:
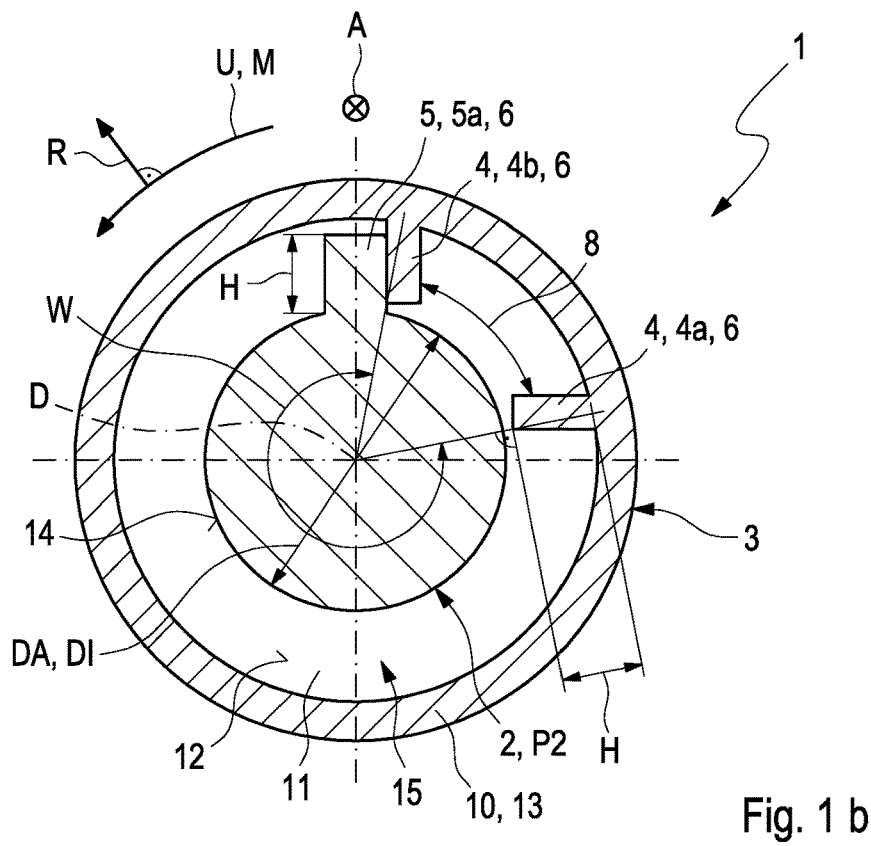

In FIG. 1b, the examples of FIG. 1a is shown, wherein the shaft 2 in the second rotary position P2 is arranged relative to the bearing bush 3. Relative to the bearing bush 3, the shaft 2 is rotatable between the first rotary position P1 and the second rotary position P2 about an axis of rotation D of the shaft 2 extending along the axial direction A. On the bearing bush 3, a first bush projection 4, 4a is non-rotatably present relative to the bearing bush 3. On the shaft 2, a first shaft projection 5, 5a is non-rotatably arranged relative to the shaft 2.

As is noticeable by way of the FIGS. 1a and 1b, the first bush projection 4, 4a and the first shaft projection 5, 5a are matched to one another in such a manner that the first bush projection 4, 4a forms a rotary stop 6 for the first shaft projection 5, 5a. By means of the rotary stop 6, the rotational movement of the shaft 2 is limited between the first and the second rotary position P1, P2. Thus, the rotary stop 6 fixes the first and the second rotary position P1, P2 of the shaft 2 relative to the bearing bush 3. On the bearing bush 3, a second bush projection 4, 4b can be arranged. The second bush projection 4b can be formed analogously to the first bush projection 4, 4a. The second bush projection 4, 4b can be arranged along the circumferential direction U of the bearing bush 3 at a bush projection distance 8 relative to the first bush projection 4, 4*a*.

Figure 2:
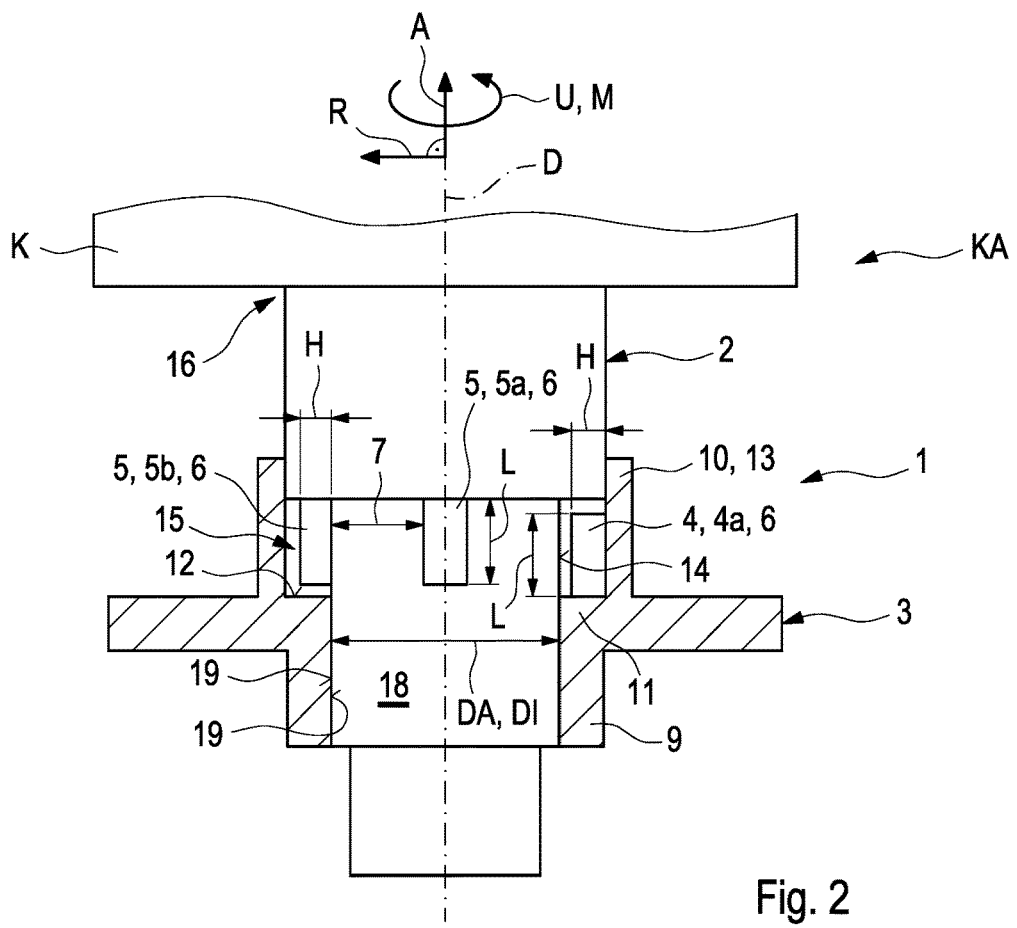

FIG. 2 shows an example of a valve arrangement KA according to the invention, which comprises an exemplary shaft-bearing bush assembly 1 according to the invention. The shaft 2 of the shaft-bearing bush assembly 1 exemplarily shown in FIG. 2 can comprise a second shaft projection 5, 5*b*. The second shaft projection 5, 5*b* can be designed analogously to the first shaft projection 5*a*. The second shaft projection 5, 5*b* can be arranged along a circumferential direction U of the shaft 2 at a shaft projection distance 7 relative to the first shaft projection 5, 5*a*. In a receiving region 18 of the shaft 2, in which the shaft 2 is received in the bearing bush 3, the shaft 2 can comprise a bearing surface 19. Likewise, the bearing bush 3 can comprise a bearing surface 19. The shaft 2 and/or the valve K and/or the bearing bush 3 can be formed of a plastic. Such a plastic can be a thermoplastic. Such a plastic can be a blend. Such a plastic can comprise fillers and/or reinforcing materials. The shaft 2, the valve K and the bearing bush 3 can each be formed in one piece of a one-component plastic.

Both the first and also the second shaft projection 5, 5*a*, 5*b* can be provided on the shaft 2, and both the first and also the second bush projection 4, 4*a*, 4*b* can be provided on the bearing bush 3. Corresponding to the example of FIGS. 1*a* and 1*b*, the first and also the second shaft projection 5, 5*a*, 5*b* can be provided on the shaft 2 alternatively to this, wherein on the bearing bush 3 exclusively the first bush projection 4, 4*a* is present. As shown in FIG. 2, merely the first shaft projection 5, 5*a* can be arranged on the shaft 2 alternatively to this, wherein the bearing bush 3 comprises both the first and also the second bush projection 4, 4*a*, 4*b*.

As shown in the cross section perpendicularly to the axial direction A of the FIGS. 1*a* and 1*b*, the first shaft projection 5, 5*a* can be arranged along the circumferential direction U between the first and the second bush projection 4, 4*a*, 4*b*. Alternatively to this, the first bush projection 4, 4*a* can be arranged in the cross section perpendicularly to the axial direction A along the circumferential direction U between the first and the second shaft projection 5, 5*a*, 5*b*, which however is not shown in the FIGS. 1*a* and 1*b*.

Figure 3:
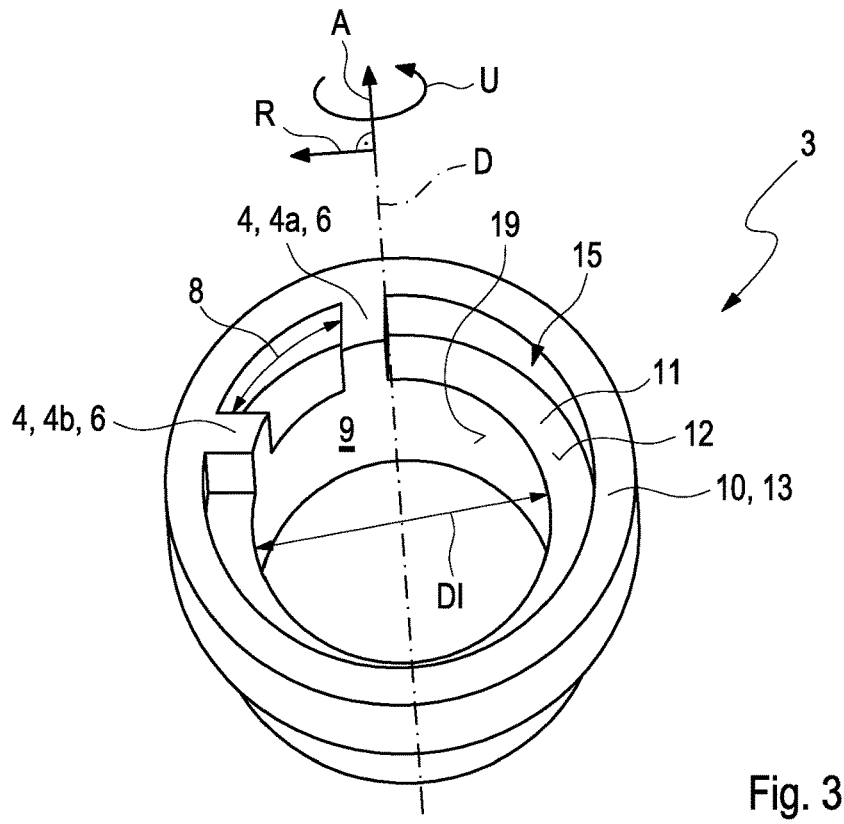

FIG. 3 exemplarily shows a bearing bush 3 for a shaft-bearing bush assembly 1 according to the invention in a perspective representation. The bearing bush 3 can comprise a bearing section 9 which in the axial direction A merges in a transition 11 into a stop section 10. The shaft 2 can be rotatably mounted in the bearing section 9 of the bearing bush 3. In the stop section 10, the first and/or second bush projection 4, 4*a*, 4*b* can be arranged. The bearing surface 19 of the bearing bush 3 can be present in the bearing section 9 of the bearing bush 3. At least one bearing surface 19—i.e. the bearing surface 19 of the shaft 2 and/or the bearing surface 19 of the bearing bush 3—can be substantially smooth or have a structure for receiving a lubricant.

As illustrated by the FIGS. 1*a*, 1*b*, 2 and 3, the first and/or second shaft projection 5, 5*a*, 5*b* can be formed rib-like. At least one of the first and/or second shaft projections 5, 5*a*, 5*b* formed rib-like can have a rib length l measured in the axial direction A of 4 mm to 6 mm. At least one of the first and/or second shaft projections 5, 5*a*, 5*b* can have a rib height H measured away from an outer surface 14 of the shafts 2 of 2 mm to 8 mm. Alternatively or additionally, the first and/or second bush projection 4, 4*a*, 4*b* can be formed rib-like. At least one of the first and/or second bush projections 4, 4*a*, 4*b* formed rib-like can have a rib length l measured in the axial direction of 4 to 6 mm and a rib height H measured radially or 2 mm to 8 mm. At least one of the first and second shaft projections 5, 5*a*, 5*b* can be integrally moulded, i.e. material-uniformly and in one piece, on the shaft 2. Alternatively or additionally, at least one of the first and/or second bush projections 4, 4*a*, 4*b* can be integrally moulded on the bearing bush 3, i.e. material-uniformly and in one piece.

Optionally, the bush projections 4, 4*a*, 4*b* can be radially connected in order to improve the stiffness and strength of the rotary stops 6. Alternatively or additionally, such a radial connection can also be present between the shaft projections 5, 5*a*, 5*b*.

From the FIGS. 2 and 3 it is evident that the first and/or second bush projection 4, 4*a*, 4*b* can be arranged on an axial bush end face 12 of the bearing bush 3. The axial bush end face 12 can be arranged at the transition 11 between the bearing section 9 and the stop section 10. The first and/or second bush projection 4, 4*a*, 4*b*, can be arranged on the bush end face 12 projecting from the axial bush end face 12 along the axial direction A. The bearing bush 3 can comprise a circumferential stop section collar 13. The stop section collar 13 can be designed so as to project axially from the bush end face 12 and circumferentially in the circumferential direction U of the bearing bush 3. From the stop section collar 13, the first and/or second bush projection 4, 4*a*, 4*b* can project radially to the inside.

As illustrated in the FIGS. 1*a*, 1*b* and FIG. 3, the first and/or second bush projection 4, 4*a*, 4*b* can limit a pocket-like recess 15 present on the bearing bush 3. The end face 12 of the bearing bush 3 can limit the pocket-like recess 15 in the axial direction. According to the example of FIGS. 1*a* and 1*b*, the first shaft projection 5, 5*a* can b rotatably received in the pocket-like recess 15 between the first and second rotary position P1 and P2. The stop section collar 13 can at least partly or completely enclose the region of the shaft 2 in which the first and/or second shaft projection 5, 5*a*, 5*b* is present.

Alternatively or additionally, the first and/or second shaft projection 5, 5*a*, 5*b* according to the example of FIG. 2 can limit a pocket-like recess 15 present on the shaft 2. The pocket-like recess 15 present on the shaft 2 can be formed analogously to the pocket-like recess of the bearing bush 3 described above. The shaft 2 can have an outer diameter DA of 10 to 30 mm. The outer diameter DA of the shaft 2 can be matched to an inner diameter DI of the bearing bush 3 present in the bearing section 9. This means that the inner diameter DI of the bearing bush 3 can likewise be 10 to 30 mm. Here, the outer diameter DA of the shaft 2 and the inner diameter DI of the bearing bush 3 can be matched to one another for forming a clearance fit. On the shaft 2 of the shaft-bearing bush assembly 1 a fastening device 16 can be provided, by means of which the valve K can be non-rotatably fastened relative to the shaft 2. In the valve arrangement KA for an air-conditioning system likewise shown in FIG. 2, the valve K of the valve arrangement KA is non-rotatably fastened relative to the shaft 2 on the shaft 2 by means of the fastening device 16.

Figure 4:
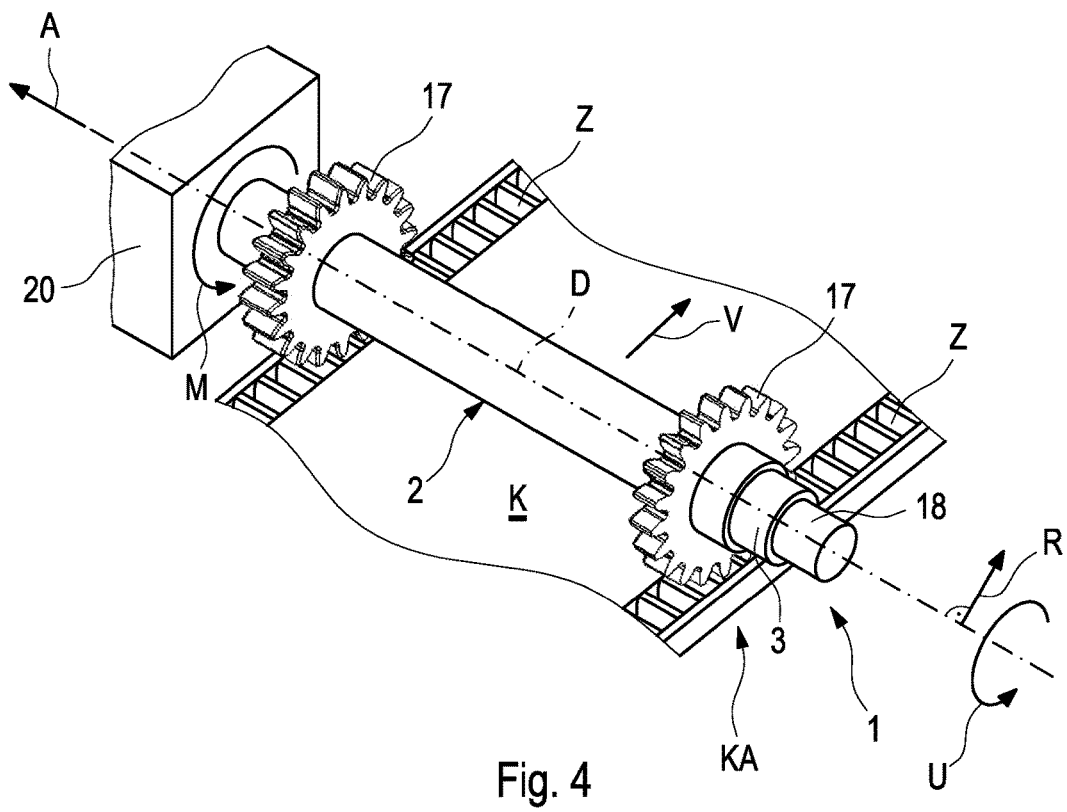

Alternatively to the example of FIG. 2, a gear wheel 17 can be non-rotatably arranged on the shaft 2 in accordance with the example of FIG. 4 which shows a further example of a valve arrangement KA according to the invention with a shaft-bearing bush assembly 1 according to the invention. By means of this gear wheel 17, a torque M for moving the valve K can be transmitted.

Figure 5:
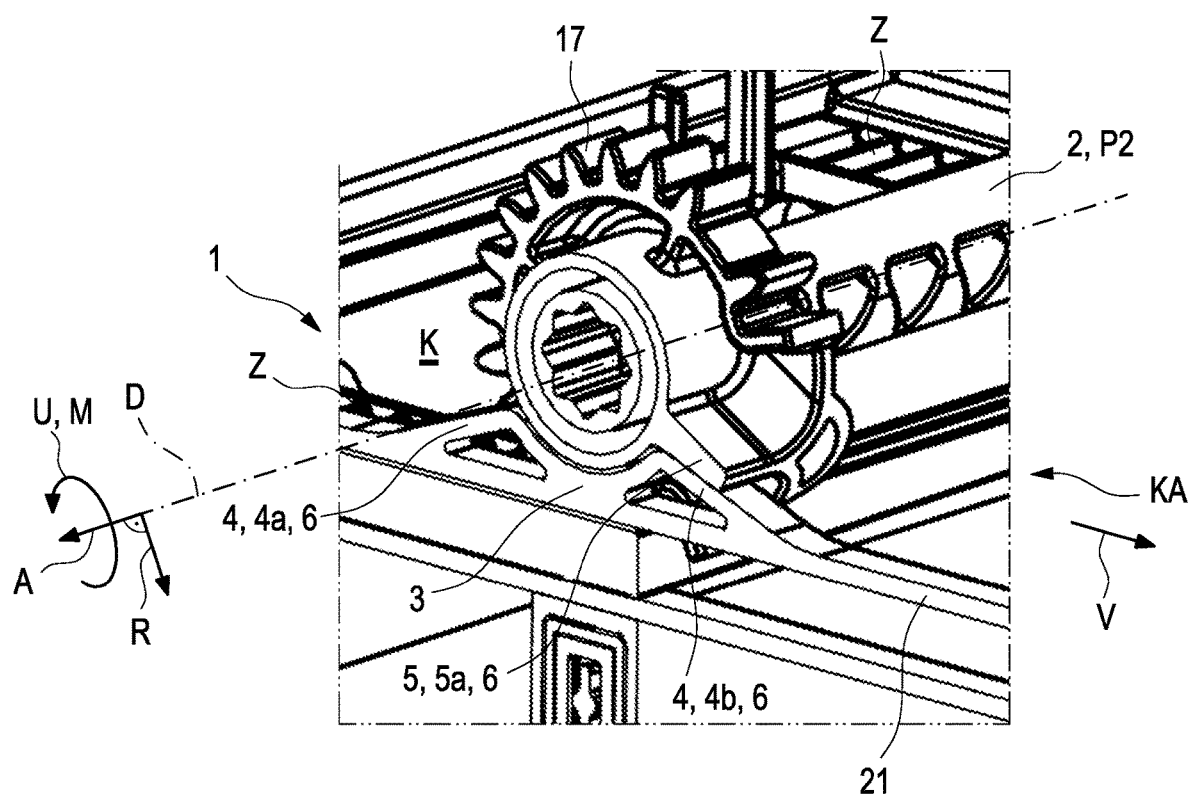

In FIG. 5, a further example of a valve arrangement KA according to the invention with a further example of a shaft-bearing bush assembly 1 according to the invention is illustrated in a perspective representation. Accordingly, the bearing bush 3 can be integrally moulded on a housing 21. This means that the bearing bush 3 can be formed material-uniformly and in one piece with the housing 21. The housing 21 can serve for guiding the valve K. The housing 21 can additionally serve for supporting bearing forces, stop forces and drive torques of the shaft-bearing bush assembly 1.

As already illustrated above, the FIGS. 2, 4 and 5 show alternative examples for a valve arrangement KA according to the invention for an air-conditioning system. Accordingly, the valve arrangement KA comprises an adjustable valve K, by means of which a fluid flow can be influenced. In addition, the valve arrangement KA comprises a shaft-bearing bush assembly 1 according to the invention, which for adjusting the valve K drive-connects a drive device 20 of the valve arrangement KA to the valve K.

According to the example of FIG. 2, the valve K can be formed so as to be rotatable together with the shaft 2 about the axis of rotation D. This means that the valve K can be formed in the manner of a throttle valve rotatable about the axis of rotation D.

According to the alternative example of FIG. 5, the valve K can be an adjustable sliding valve. Sliding valves are adjusting valves or adjustable closure elements in the understanding of the person skilled in the art, which are adjustable along an adjusting direction. Here, the sliding valve cannot be folded over about an axis. The valve K formed as sliding valve can be adjusted along an adjusting direction V. The adjusting direction V can follow a linear course. On the valve K formed as sliding valve a rack device Z can be present, in which the gear wheel 17 non-rotatably arranged on the shaft 2 can engage. By means of the engagement of the gear wheel 17 in the rack device Z, a torque M provided by the drive device 20 can be converted into an adjusting movement of the valve K formed as sliding valve along the adjusting direction V.

The valve arrangements KA of the FIGS. 2, 4 and 5 can be employed in an air-conditioning system for air-conditioning a vehicle interior which is not shown. Such an air-conditioning system additionally comprises a fluid passage through which a fluid flow that can be influenced by means of the valve arrangement K can flow. Here, the fluid flow can be influenced by means of the valve K of the valve arrangement KA.

The invention claimed is:

1. A shaft-bearing bush assembly for a valve arrangement having a valve for an air-conditioning system, comprising:
   a shaft extending along an axial direction, the shaft being drive-connectable to the valve;
   a bearing bush, in which the shaft is rotatably received relative to the bearing bush between a first rotary position and a second rotary position about an axis of rotation extending along the axial direction;
   a bush projection non-rotatably arranged on the bearing bush relative to the bearing bush and a shaft projection non-rotatably arranged on the shaft relative to the shaft;
   wherein the bush projection and the shaft projection are matched to one another such that the bush projection provides a rotary stop for the shaft projection for limiting the rotary movement of the shaft between the first rotary position and the second rotary position; and
   wherein at least one of (i) the shaft projection is structured rib-like with a rib length measured in the axial direction of 4 mm to 6 mm and a rib height measured radially away from an outer surface of the shaft of 2 mm to 8 mm, and (ii) the bush projection is structured rib-like with a rib length measured in the axial direction of 4 to 6 mm and a radially measured rib height of 2 mm to 8 mm.

2. The shaft-bearing bush assembly according to claim 1, further comprising at least one of:
   a second shaft projection disposed on the shaft and non-rotatably arranged relative to the shaft, the second shaft projection arranged along a circumferential direction of the shaft at a shaft projection distance relative to the shaft projection; and
   a second bush projection disposed on the bearing bush and non-rotatably arranged relative to the bearing bush, the second bush projection arranged along the circumferential direction of the bearing bush at a bush projection distance relative to the bush projection.

3. The shaft-bearing bush assembly according to claim 2, wherein at least one of:
   in a cross section perpendicularly to the axial direction the shaft projection and the second shaft projection are arranged projecting from the shaft and offset relative to one another by an angle of rotation measured in the circumferential direction at the shaft projection distance relative to one another; and
   in the cross section perpendicularly to the axial direction the bush projection and the second bush projection are arranged projecting from the bearing bush and offset relative to one another by an angle of rotation measured in the circumferential direction at the bush projection distance relative to one another.

4. The shaft-bearing bush assembly according to claim 2, wherein:
   on the shaft both the shaft projection and the second shaft projection are provided and on the bearing bush exclusively the bush projection is present; or
   on the bearing bush both the bush projection and the second bush projection are present and on the shaft exclusively the shaft projection is present.

5. The shaft-bearing bush assembly according claim 4, wherein:
   in a cross section perpendicularly to the axial direction the bush projection is arranged along the circumferential direction between the shaft projection and the second shaft projection; or
   in the cross section perpendicularly to the axial direction the shaft projection is arranged along the circumferential direction between the bush projection and the second bush projection.

6. The shaft-bearing bush assembly according to claim 1, wherein:
   the bearing bush comprises a bearing section that merges in the axial direction into a stop section,
   the shaft is rotatably mounted in the bearing section; and
   in the stop section, the bush projection is arranged.

7. The shaft-bearing bush assembly according to claim 6, wherein the bush projection is arranged on an axial bush end face of the bearing bush arranged at a transition between the bearing section and the stop section projecting from the bush end face along the axial direction.

8. The shaft-bearing bush assembly according to claim 6, wherein on the bearing bush a stop section collar axially projecting from the bush end face and running around the bearing bush in the circumferential direction is present, and wherein the bush projection projects from the stop section collar radially to the inside.

9. The shaft-bearing bush assembly according to claim 1, wherein at least one of:
the shaft projection limits a pocket-like recess present on the shaft, and
the bush projection limits a pocket-like recess present on the bearing bush.

10. The shaft-bearing bush assembly according to claim 1, wherein one of:
on the shaft a fastening device is provided, structured and arranged to fasten the valve non-rotatably relative to the shaft,
a valve body of the valve is integrally moulded on the shaft; and
on the shaft a gear wheel for transmitting a torque for moving the valve is non-rotatably arranged.

11. The shaft-bearing bush assembly according to claim 1, wherein:
the shaft comprises a bearing surface in a receiving region of the shaft, and the shaft is received in the bearing bush via the receiving region;
the bearing bush comprises a bearing surface; and
the bearing surface is substantially smooth or has a structure for receiving a lubricant.

12. The shaft-bearing bush assembly according to claim 1, wherein at least one of:
the shaft projection is integrally moulded on the shaft;
the bush projection is integrally moulded on the bearing bush, and
the bearing bush is integrally moulded on a housing.

13. A valve arrangement for an air-conditioning system, comprising: an adjustable valve for influencing a fluid flow;
a shaft-bearing bush assembly, wherein the shaft-bearing bush assembly for adjusting the valve drive-connects a drive device of the valve arrangement to the valve, the shaft-bearing bush assembly including:
a shaft extending along an axial direction, the shaft being drive-connectable to the valve;
a bearing bush, in which the shaft is rotatably received relative to the bearing bush between a first rotary position and a second rotary position about an axis of rotation extending along the axial direction;
a first bush projection non-rotatably arranged on the bearing bush relative to the bearing bush and a shaft projection non-rotatably arranged on the shaft relative to the shaft;
a second bush projection disposed on the bearing bush and non-rotatably arranged relative to the bearing bush, the second bush projection arranged along the circumferential direction of the bearing bush at a bush projection distance relative to the first bush projection;
wherein the first bush projection, the second bush projection and the shaft projection are matched to one another such that the first bush projection and the second bush projection provide a rotary stop for the shaft projection for limiting the rotary movement of the shaft between the first rotary position and the second rotary position;
wherein the first bush projection and the second bush projection are each structured as a rib extending radially and axially along the bearing bush; and
wherein at least one of:
the shaft projection has a rib length measured in the axial direction of 4 mm to 6 mm and a rib height measured radially away from an outer surface of the shaft of 2 mm to 8 mm; and
the first bush projection and the second bush projection each have a rib length measured in the axial direction of 4 to 6 mm and a radially measured rib height of 2 mm to 8 mm.

14. The valve arrangement according to claim 13, wherein the shaft-bearing bush assembly further includes a second shaft projection disposed on the shaft and non-rotatably arranged relative to the shaft, the second shaft projection arranged along a circumferential direction of the shaft at a shaft projection distance relative to the shaft projection.

15. The valve arrangement according to claim 13, in a cross section perpendicularly to the axial direction the bush projection and the second bush projection are arranged projecting from the bearing bush and offset relative to one another by an angle of rotation measured in the circumferential direction at the bush projection distance relative to one another.

16. An air-conditioning system for air-conditioning a vehicle interior, comprising:
a valve arrangement including an adjustable valve for influencing a fluid flow and a shaft-bearing bush assembly for adjusting the valve;
a fluid passage, through which the fluid flow is flowable;
wherein the shaft-bearing bush assembly includes:
a shaft extending along an axial direction, the shaft being drive-connectable to the valve;
a bearing bush, in which the shaft is rotatably received relative to the bearing bush between a first rotary position and a second rotary position about an axis of rotation extending along the axial direction;
a first bush projection non-rotatably arranged on the bearing bush relative to the bearing bush and a shaft projection non-rotatably arranged on the shaft relative to the shaft;
a second bush projection disposed on the bearing bush and non-rotatably arranged relative to the bearing bush, the second bush projection arranged along the circumferential direction of the bearing bush at a bush projection distance relative to the first bush projection;
wherein the first bush projection, the second bush projection and the shaft projection are matched to one another such that the first bush projection and the second bush projection provide a rotary stop for the shaft projection for limiting the rotary movement of the shaft between the first rotary position and the second rotary position;
wherein in a cross section perpendicularly to the axial direction the first bush projection and the second bush projection are arranged projecting radially from the bearing bush and offset relative to one another by an angle of rotation of at least 180 degrees measured in the circumferential direction at the bush projection distance relative to one another; and
wherein at least one of:
the shaft projection is structured rib-like with a rib length measured in the axial direction of 4 mm to 6 mm and a rib height measured radially away from an outer surface of the shaft of 2 mm to 8 mm; and
the first bush projection and the second bush projection are each structured rib-like with a rib length measured in the axial direction of 4 to 6 mm and a radially measured rib height of 2 mm to 8 mm.

17. The air-conditioning system according to claim 16, wherein the shaft-bearing bush assembly further includes a second shaft projection disposed on the shaft and non-rotatably arranged relative to the shaft, the second shaft projection arranged along a circumferential direction of the shaft at a shaft projection distance relative to the shaft projection.

* * * * *